(12) United States Patent
Ono (10) Patent No.: US 11,273,809 B2
(45) Date of Patent: Mar. 15, 2022

(54) CONTROL DEVICE FOR CONTROLLING BRAKE FORCE GENERATED ON WHEEL BY VEHICLE BRAKE SYSTEM, AND CONTROL METHOD

(71) Applicant: Robert Bosch GmbH, Stuttgart (DE)

(72) Inventor: Shunsaku Ono, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 16/347,245

(22) PCT Filed: Oct. 10, 2017

(86) PCT No.: PCT/IB2017/056248
§ 371 (c)(1),
(2) Date: May 3, 2019

(87) PCT Pub. No.: WO2018/083553
PCT Pub. Date: May 11, 2018

(65) Prior Publication Data
US 2019/0256065 A1 Aug. 22, 2019

(30) Foreign Application Priority Data
Nov. 4, 2016 (JP) .............................. JP2016-215772

(51) Int. Cl.
*B60T 8/1761* (2006.01)
*B60T 7/12* (2006.01)
*B60T 8/58* (2006.01)

(52) U.S. Cl.
CPC .............. *B60T 8/1761* (2013.01); *B60T 7/12* (2013.01); *B60T 8/17616* (2013.01); *B60T 8/58* (2013.01); *B60T 2270/10* (2013.01)

(58) Field of Classification Search
CPC ...... B60T 8/1761; B60T 8/17616; B60T 7/12; B60T 8/58; B60T 2270/10
See application file for complete search history.

(56) References Cited

U.S. PATENT DOCUMENTS

| 5,641,210 A * | 6/1997 | Moon ..................... B60T 8/364 |
| | | 303/119.1 |
| 2004/0002804 A1* | 1/2004 | Walenty .................. B60T 8/172 |
| | | 701/71 |

(Continued)

FOREIGN PATENT DOCUMENTS

| CN | 1087058 A | 5/1994 |
| CN | 1148017 A | 4/1997 |

(Continued)

OTHER PUBLICATIONS

International Search Report for Application No. PCT/IB2017/056248 dated Mar. 19, 2018 (English Translation, 2 pages).

*Primary Examiner* — Genna M Mott
(74) *Attorney, Agent, or Firm* — Michael Best & Friedrich LLP (57) ABSTRACT

A controller and a control method capable of improving stability of a vehicle while improving usability of a brake system by a user.

The controller includes: an operation state determination section determining an operation state of the brake system by the user; a slippage degree acquisition section acquiring a degree of slippage of a wheel; a target setting section setting a target of the degree of the slippage; and a braking force control execution section increasing or decreasing a braking force generated on the wheel on the basis of a comparison result between the degree of the slippage and the target in the case where the operation state determination section determines that the operation state is an operation state to instruct gradual deceleration.

16 Claims, 7 Drawing Sheets

(56) References Cited

U.S. PATENT DOCUMENTS

| | | | |
|---|---|---|---|
| 2008/0319611 A1* | 12/2008 | Song | B60T 8/172 |
| | | | 701/41 |
| 2011/0264349 A1* | 10/2011 | Okubo | B60T 8/17616 |
| | | | 701/71 |
| 2012/0192669 A1* | 8/2012 | Lo | B62L 3/02 |
| | | | 74/471 R |
| 2013/0166167 A1* | 6/2013 | Sekiya | B60T 8/1761 |
| | | | 701/79 |
| 2017/0057513 A1* | 3/2017 | Ohashi | B60W 30/18009 |
| 2018/0134156 A1* | 5/2018 | Nonaka | B60K 28/16 |

FOREIGN PATENT DOCUMENTS

| | | |
|---|---|---|
| CN | 1194220 A | 9/1998 |
| CN | 2399255 Y | 10/2000 |
| CN | 102616222 A | 8/2012 |
| EP | 0577076 | 1/1994 |
| EP | 2527217 | 11/2012 |
| JP | 2005041295 | 2/2005 |
| JP | 2006015952 | 1/2006 |
| JP | 2014201200 | 10/2014 |

* cited by examiner

CONTROL DEVICE FOR CONTROLLING BRAKE FORCE GENERATED ON WHEEL BY VEHICLE BRAKE SYSTEM, AND CONTROL METHOD

BACKGROUND OF THE INVENTION

The invention relates to a controller that controls a braking force generated on a wheel by a brake system for a vehicle, and to a control method for controlling a braking force generated on a wheel by a brake system for a vehicle.

A controller executes anti-lock brake control, in which a braking force generated on a wheel is repeatedly increased and decreased, during rapid deceleration of a vehicle, and such a controller is available as a conventional controller. When the wheel is locked or possibly locked, the controller actuates a brake system to decrease the braking force generated on the wheel. When locking or possible locking of the wheel is cancelled, the controller actuates the brake system to increase the braking force generated on the wheel. When such action is repeatedly performed during the rapid deceleration of the vehicle, suppression of locking of the wheel and shortening of a braking distance are simultaneously achieved (for example, see JP-A-2014-201200).

SUMMARY OF THE INVENTION

In the anti-lock brake control, the conventional controller assumes that vehicle travel has typical characteristics (for example, a road surface characteristic, a tire characteristic, a vehicle characteristic, and the like), for example, and, based on this assumption, repeatedly increases and decreases the braking force, so as to generate such a degree of slippage of the wheel as to increase a friction coefficient to be the highest under those characteristics. For this reason, depending on the road surface characteristic, the tire characteristic, the vehicle characteristic, or the like, for example, even when a user has no intention of rapidly decelerating the vehicle, the conventional controller possibly recognizes locking or possible locking of the vehicle and thereby executes the anti-lock brake control. In such a case, an increase and a decrease in the braking force are transmitted to an operation section of the brake system, and the user thereby receives a sense of discomfort. In addition, even when the user has no intention of rapidly decelerating the vehicle, such a degree of the slippage of the wheel as to increase the friction coefficient to be the highest is generated. As a result, a tire is possibly brought into a state where unnecessary sideslip thereof is likely to occur.

The invention has been made with problems as described above as the background and therefore obtains a controller capable of improving stability of a vehicle while improving usability of a brake system by a user. The invention also obtains a control method capable of improving stability of a vehicle while improving usability of a brake system by a user.

A controller according to the invention is a controller that controls a braking force generated on a wheel of a vehicle by a brake system of the vehicle, includes a braking force control execution section that makes the brake system execute anti-lock brake control to repeatedly increase and decrease the braking force generated on the wheel in a specified state during rapid deceleration of the vehicle, and further includes: an operation state determination section determining an operation state of the brake system by a user; a slippage degree acquisition section acquiring a degree of slippage of the wheel; and a target setting section setting a target of the degree of the slippage. In the case where the operation state determination section determines that the operation state is an operation state to instruct gradual deceleration, the braking force control execution section increases or decreases the braking force generated on the wheel on the basis of a comparison result between the degree of the slippage acquired by the slippage degree acquisition section and the target set by the target setting section.

A control method according to the invention is a control method for controlling a braking force generated on a wheel of a vehicle by a brake system of the vehicle, includes a braking force control execution step of making the brake system execute anti-lock brake control to repeatedly increase and decrease the braking force generated on the wheel in a specified state during rapid deceleration of the vehicle, and further includes: an operation state determination step of determining an operation state of the brake system by a user; a slippage degree acquisition step of acquiring a degree of slippage of the wheel; and a target setting step of setting a target of the degree of the slippage. In the case where it is determined in the operation state determination step that the operation state is an operation state to instruct gradual deceleration, in the braking force control execution step, the braking force generated on the wheel is increased or decreased on the basis of a comparison result between the degree of the slippage acquired in the slippage degree acquisition step and the target set in the target setting step.

In the controller and the control method according to the invention, the anti-lock brake control to repeatedly increase and decrease the braking force generated on the wheel is executed in the specified state during the rapid deceleration of the vehicle. Meanwhile, in the case where it is determined that the operation state of the brake system by the user is the operation state to instruct the gradual deceleration, the braking force generated on the wheel is increased or decreased on the basis of the comparison result between the degree of the slippage acquired by the slippage degree acquisition section and the target of the degree of the slippage set by the target setting section. Accordingly, in a state where the user has no intention of rapidly decelerating the vehicle, recognition of locking or possible locking of the wheel can be suppressed, and thus the user can be suppressed from receiving a sense of discomfort unnecessarily. In addition, in the state where the user has no intention of rapidly decelerating the vehicle, for example, the target setting section sets the target to be low. In this way, such a degree of the slippage as to increase a friction coefficient of the wheel to be the highest can be less likely to be generated. Thus, a state where a tire is likely to sideslip unnecessarily regardless of a fact that the user has no intention of rapidly decelerating the vehicle can be suppressed.

DETAILED DESCRIPTION

A description will hereinafter be made on a controller and a control method according to the invention by using the drawings.

Note that a description will hereinafter be made on a case where a vehicle to which the controller and the control method according to the invention are applied is a motorcycle; however, the vehicle is not limited to such a case and may be another vehicle (a four-wheeled motor vehicle or the like). In addition, each of a configuration, an action, and the like, which will be described below, is merely one example. The controller and the control method according to the invention as well as a brake system to which those are applied are not limited to a case with such a configuration, such an action, and the like. For example, a description will hereinafter be made on a case where the brake system includes three wheel cylinders; however, the brake system may have the different number of the wheel cylinders. In addition, a description will hereinafter be made on a case where the brake system can perform an interlocking brake action for a front wheel and a rear wheel; however, the brake actions for the front wheel and the rear wheel may constantly be performed independently.

In the drawings, the same or similar members or portions will be denoted by the same reference sign. In addition, a detailed structure will appropriately be depicted in a simplified manner or will not be depicted. Furthermore, an overlapping or similar description will not be made or will appropriately be simplified.

A description will hereinafter be made on a brake system according to an embodiment.
<Schematic Configuration and Schematic Action of Brake System>

A description will be made on a schematic configuration and a schematic action of the brake system according to an embodiment.

Figure 1:
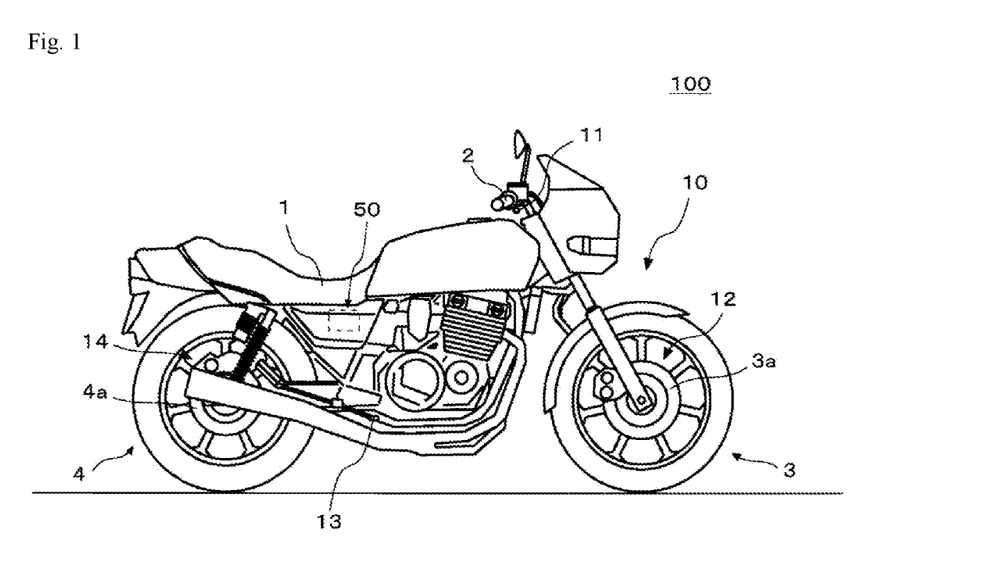
FIG. 1 is a configuration diagram of a vehicle on which a brake system according to an embodiment of the invention is mounted.
Figure 2:
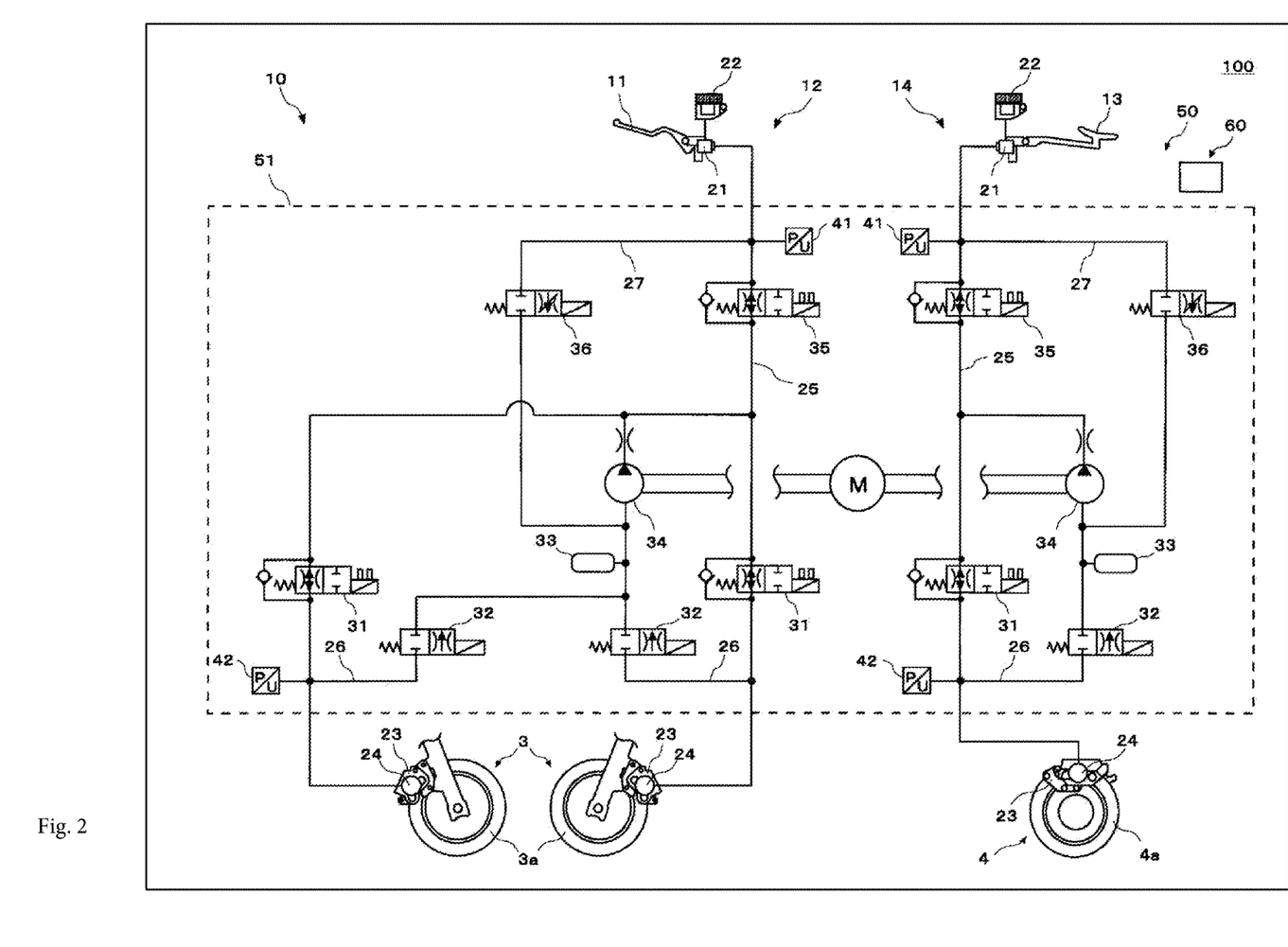
FIG. 2 is a configuration diagram of the brake system according to the embodiment of the invention.
Figure 3:
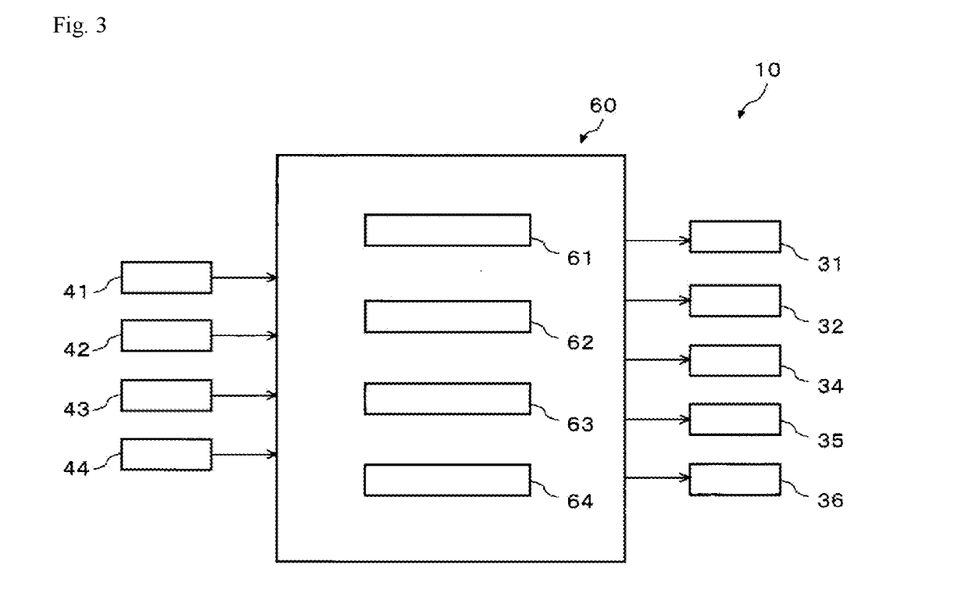
FIG. 3 is a system configuration diagram of a main section of the brake system according to the embodiment of the invention.

FIG. 1 is a configuration diagram of a vehicle on which the brake system according to the embodiment of the invention is mounted. FIG. 2 is a configuration diagram of the brake system according to the embodiment of the invention. FIG. 3 is a system configuration diagram of a main section of the brake system according to the embodiment of the invention. Note that both side surfaces of a front wheel 3 are aligned for depiction in FIG. 2.

As depicted in FIG. 1 and FIG. 2, a brake system 10 is mounted on a vehicle 100. The vehicle 100 is a motorcycle such as a two-wheeled motor vehicle or a three-wheeled motor vehicle. The vehicle 100 includes: a trunk 1; a handlebar 2 that is held by the trunk 1 in a freely turnable manner; the front wheel 3 that is held by the trunk 1 in a freely turnable manner with the handlebar 2; and a rear wheel 4 that is held by the trunk 1 in a freely rotatable manner.

The brake system 10 includes: a front brake operation section 11; a front-wheel brake mechanism 12 that brakes the front wheel 3 in an interlocking manner with at least the front brake operation section 11; a rear brake operation section 13; and a rear-wheel brake mechanism 14 that brakes the rear wheel 4 in an interlocking manner with at least the rear brake operation section 13.

The front brake operation section 11 is provided on the handlebar 2 and is operated by a user's hand. The front brake operation section 11 is a brake lever, for example. The rear brake operation section 13 is provided in a lower portion of the trunk 1 and is operated by a user's foot. The rear brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which a brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion thereof to which a downstream end of the secondary channel 26 is connected, a first valve (USV) 35 is provided. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and is closed in an energized state, for example. The outlet valve 32 is an electromagnetic valve that is closed in the unenergized state and is opened in the energized state, for example. The first valve 35 is an electromagnetic valve that is opened in the unenergized state and is closed in the energized state, for example. The second valve 36 is an electromagnetic valve that is closed in the unenergized state and is opened in the energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and a controller (ECU) 60. In the brake system 10, the hydraulic pressure control unit 50 is a unit that has a function of controlling a hydraulic pressure of the brake fluid in each of the wheel cylinders 24, that is, a braking force on the front wheel 3 generated by the front-wheel brake mechanism 12; and a braking force on the rear wheel 4 generated by the rear-wheel brake mechanism 14.

The members may collectively be provided in the single base body 51 or may separately be provided in the multiple base bodies 51. The controller 60 may be provided as one unit or may be divided into multiple units. In addition, the controller 60 may be attached to the base body 51 or may be attached to a member other than the base body 51. Furthermore, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, the controller 60 opens the inlet valve 31, closes the outlet valve 32, opens the first valve 35, and closes the second valve 36. When the front brake operation section 11 is operated in such a state, in the front-wheel brake mechanism 12, the piston (not depicted) of the master cylinder 21 is pressed to increase the hydraulic pressure of the brake fluid in the wheel cylinder 24, the brake pad (not depicted) of the brake caliper 23 is pressed against a rotor 3a of the front wheel 3, and the front wheel 3 is thereby braked. Meanwhile, when the rear brake operation section 13 is operated, in the rear-wheel brake mechanism 14, the piston (not depicted) of the master cylinder 21 is pressed to increase the hydraulic pressure of the brake fluid in the wheel cylinder 24, the brake pad (not depicted) of the brake caliper 23 is pressed against a rotor 4a of the rear wheel 4, and the rear wheel 4 is thereby braked.

In a state where an interlocking brake action that generates the braking force on each of the front wheel 3 and the rear wheel 4 is performed through the operation of the front brake operation section 11, in the front-wheel brake mechanism 12, the inlet valve 31 is opened, the outlet valve 32 is closed, the first valve 35 is opened, and the second valve 36 is closed. In the rear-wheel brake mechanism 14, the pump 34 is driven in a state where the inlet valve 31 is opened, the outlet valve 32 is closed, the first valve 35 is closed, and the second valve 36 is opened. In a state where the interlocking brake action that generates the braking force on each of the front wheel 3 and the rear wheel 4 is performed through the operation of the rear brake operation section 13, in the rear-wheel brake mechanism 14, the inlet valve 31 is opened, the outlet valve 32 is closed, the first valve 35 is opened, and the second valve 36 is closed. In the front-wheel brake mechanism 12, the pump 34 is driven in a state where the inlet valve 31 is opened, the outlet valve 32 is closed, the first valve 35 is closed, and the second valve 36 is opened.

As depicted in FIG. 2 and FIG. 3, the brake system 10 includes master-cylinder pressure sensors 41, wheel-cylinder pressure sensors 42, a front-wheel rotational speed sensor 43, and a rear-wheel rotational speed sensor 44.

The master-cylinder pressure sensor 41 detects a hydraulic pressure of the brake fluid in the master cylinder 21. The master-cylinder pressure sensor 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24. The wheel-cylinder pressure sensor 42 may detect another physical quantity that can substantially be converted to the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational speed sensor 43 detects a rotational speed of the front wheel 3. The front-wheel rotational speed sensor 43 may detect another physical quantity that can substantially be converted to the rotational speed of the front wheel 3. The rear-wheel rotational speed sensor 44 detects a rotational speed of the rear wheel 4. The rear-wheel rotational speed sensor 44 may detect another physical quantity that can substantially be converted to the rotational speed of the rear wheel 4.

The controller 60 includes a braking force control execution section 61, an operation state determination section 62, a slippage degree acquisition section 63, and a target setting section 64. The controller 60 receives detection results of various sensors such as the master-cylinder pressure sensors 41, the wheel-cylinder pressure sensors 42, the front-wheel rotational speed sensor 43, and the rear-wheel rotational speed sensor 44.

In the normal state, in a state where the interlocking brake action, which generates the braking force on each of the front wheel 3 and the rear wheel 4 through the operation of the front brake operation section 11, is performed, in a state where the interlocking brake action, which generates the braking force on each of the front wheel 3 and the rear wheel 4 through the operation of the rear brake operation section 13, is performed, or the like, when determining that the vehicle 100 is in a state where the wheel (the front wheel 3, the rear wheel 4) is locked or possibly locked during rapid deceleration of the vehicle 100, the braking force control execution section 61 executes anti-lock brake control for the wheel (the front wheel 3, the rear wheel 4).

In the anti-lock brake control, the brake system 10 is controlled so as to repeatedly increase and decrease the braking force generated on the wheel (the front wheel 3, the rear wheel 4). For example, in a braking force decreasing action, the pump 34 is driven in a state where the inlet valve 31 is closed, the outlet valve 32 is opened, the first valve 35 is opened, and the second valve 36 is closed. Meanwhile, for example, in a braking force increasing action, the inlet valve 31 is opened, the outlet valve 32 is closed, the first valve 35 is opened, and the second valve 36 is closed.

For example, the braking force control execution section 61 assumes that travel of the vehicle 100 has typical characteristics (for example, a road surface characteristic, a tire characteristic, a vehicle characteristic, and the like), and, based on this assumption, repeatedly increases and decreases the braking force, so as to generate such a degree of slippage (for example, a slip rate S) of the wheel (the front wheel 3, the rear wheel 4) as to increase a friction coefficient $\mu$ (a friction coefficient in a tire rolling direction) thereof to be the highest under those characteristics.

Figure 4:
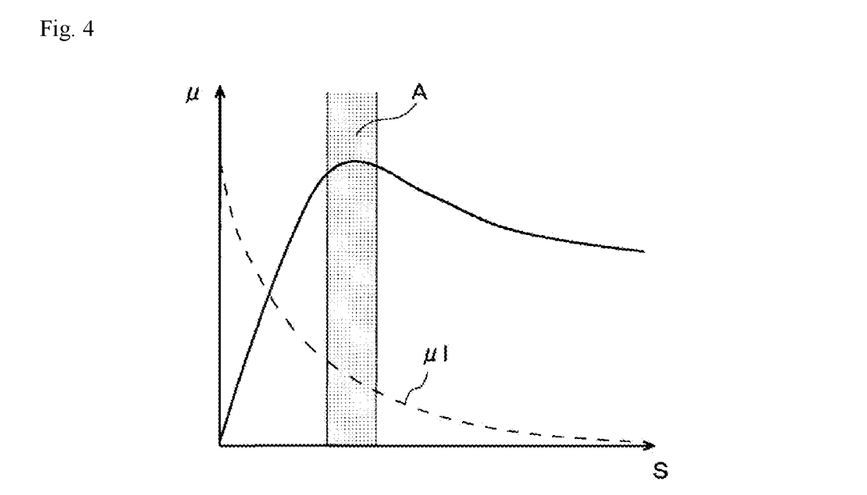
FIG. 4 is a graph that explains an operational effect of anti-lock brake control executed by the brake system according to the embodiment of the invention.
Figure 5:
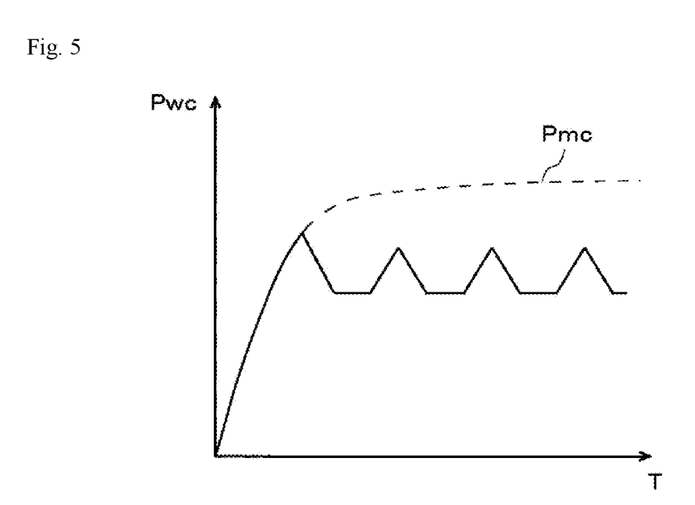
FIG. 5 is a graph that explains an operational effect of the anti-lock brake control executed by the brake system according to the embodiment of the invention.
Figure 6:
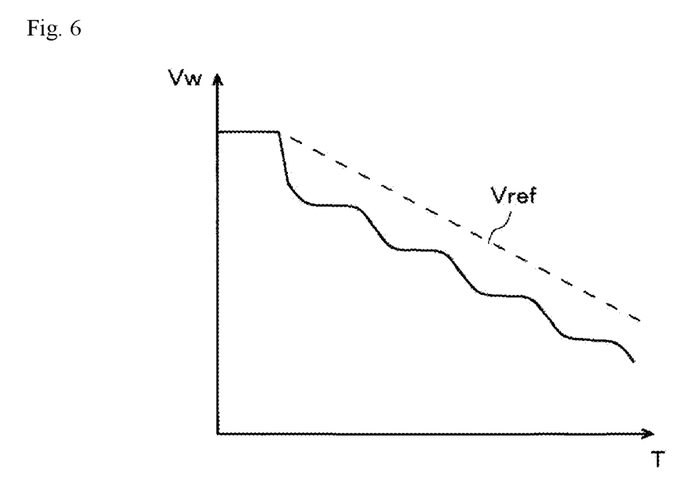
FIG. 6 is a graph that explains an operational effect of the anti-lock brake control executed by the brake system according to the embodiment of the invention.

FIG. 4 to FIG. 6 are graphs, each of which explains an operational effect of the anti-lock brake control executed by the brake system according to the embodiment of the invention. Note that, in FIG. 4, a horizontal axis represents the slip rate S of the wheel (the front wheel 3, the rear wheel 4), and a vertical axis represents the friction coefficient $\mu$. In FIG. 5, a horizontal axis represents time T, and a vertical axis represents a hydraulic pressure Pwc of the brake fluid in the wheel cylinder 24. In FIG. 6, a horizontal axis represents the time T, and a vertical axis represents a rotational speed Vw of the wheel (the front wheel 3, the rear wheel 4).

More specifically, FIG. 4 is a $\mu$-S graph of a case where the travel of the vehicle 100 has the typical characteristics (for example, the road surface characteristic, the tire characteristic, the vehicle characteristic, and the like). In such a state, in the anti-lock brake control, the slip rate S of the wheel (the front wheel 3, the rear wheel 4) as a control target is controlled to be maintained in a region A that is a region where the friction coefficient μ becomes the highest. The braking force control execution section 61 controls actions of the inlet valve 31, the outlet valve 32, the pump 34, and the like so as to bring the hydraulic pressure Pwc of the brake fluid in the wheel cylinder 24 into a state as depicted in FIG. 5, and brings the rotational speed Vw of the wheel (the front wheel 3, the rear wheel 4) as the control target into a state as depicted in FIG. 6. In this way, a braking distance of the vehicle 100 is shortened while locking or possible locking of the wheel (the front wheel 3, the rear wheel 4) is suppressed.

Here, as indicated by a dotted line in FIG. 4, a friction coefficient μl in a lateral direction of the tire does not become the highest in the region A where the friction coefficient μ is the highest. Accordingly, in a state where the above-described anti-lock brake control is executed, the tire is more likely to sideslip, and thus the travel of the vehicle 100 is more likely to become unstable.

The operation state determination section 62 determines an operation state of the brake system 10 by the user. More specifically, the operation state determination section 62 acquires the hydraulic pressure of the brake fluid in the master cylinder 21 of the front-wheel brake mechanism 12, which is detected by the master-cylinder pressure sensor 41, so as to determine an operation state of the front brake operation section 11 by the user. In addition, the operation state determination section 62 acquires the hydraulic pressure of the brake fluid in the master cylinder 21 of the rear-wheel brake mechanism 14, which is detected by the master-cylinder pressure sensor 41, so as to determine an operation state of the rear brake operation section 13 by the user. The operation state determination section 62 may determine the operation state of the brake system 10 by the user by using another physical quantity that can substantially be converted to the hydraulic pressure of the brake fluid in the master cylinder 21. For example, the operation state determination section 62 may determine the operation state of the brake system 10 by the user by using stroke amounts of the front brake operation section 11 and the rear brake operation section 13, stroke amounts of the pistons (not depicted) installed in the master cylinders 21, or the like.

The slippage degree acquisition section 63 acquires the degree of the slippage of the rear wheel 4. The slippage degree acquisition section 63 may calculate and acquire the slip rate S of the rear wheel 4 or may acquire another physical quantity that can substantially be converted to the slip rate S of the rear wheel 4.

The target setting section 64 sets a target of the degree of the slippage. The target setting section 64 sets the degree of the slippage in a region on a lower side of the region A where the friction coefficient μ is the highest in FIG. 4 as the target of the degree of the slippage. The target setting section 64 preferably changes the target in accordance with a vehicle speed of the vehicle 100, vehicle acceleration (vehicle deceleration, vehicle lateral acceleration) of the vehicle 100, the operation state of the brake system 10 by the user, a change amount of brake input generated in the brake system 10, and the like.

The controller 60 has a comfort brake function, which will be described below. As the comfort brake function, the braking force control execution section 61 executes slip control by using a determination result of the operation state determination section 62, the degree of the slippage acquired by the slippage degree acquisition section 63, and the target of the degree of the slippage set by the target setting section 64. The slip control is control that is executed by using a different algorithm from that of the anti-lock brake control.

While the anti-lock brake control is executed in a specified state during the rapid deceleration of the vehicle 100, the slip control is executed in a state where the user has no intention of rapidly decelerating the vehicle 100, that is, in the case where the operation state of the brake system 10 by the user is an operation state to instruct gradual deceleration. In addition, the comfort brake function is applied to control of the braking force on the rear wheel 4. That is, in the specified state during the deceleration of the vehicle 100, the braking force control execution section 61 executes the anti-lock brake control to increase and decrease the braking force generated on the front wheel 3 regardless of the operation state of the brake system 10 by the user.

<Comfort Brake Function>

A description will be made on the comfort brake function of the brake system according to the embodiment.

Figure 7:
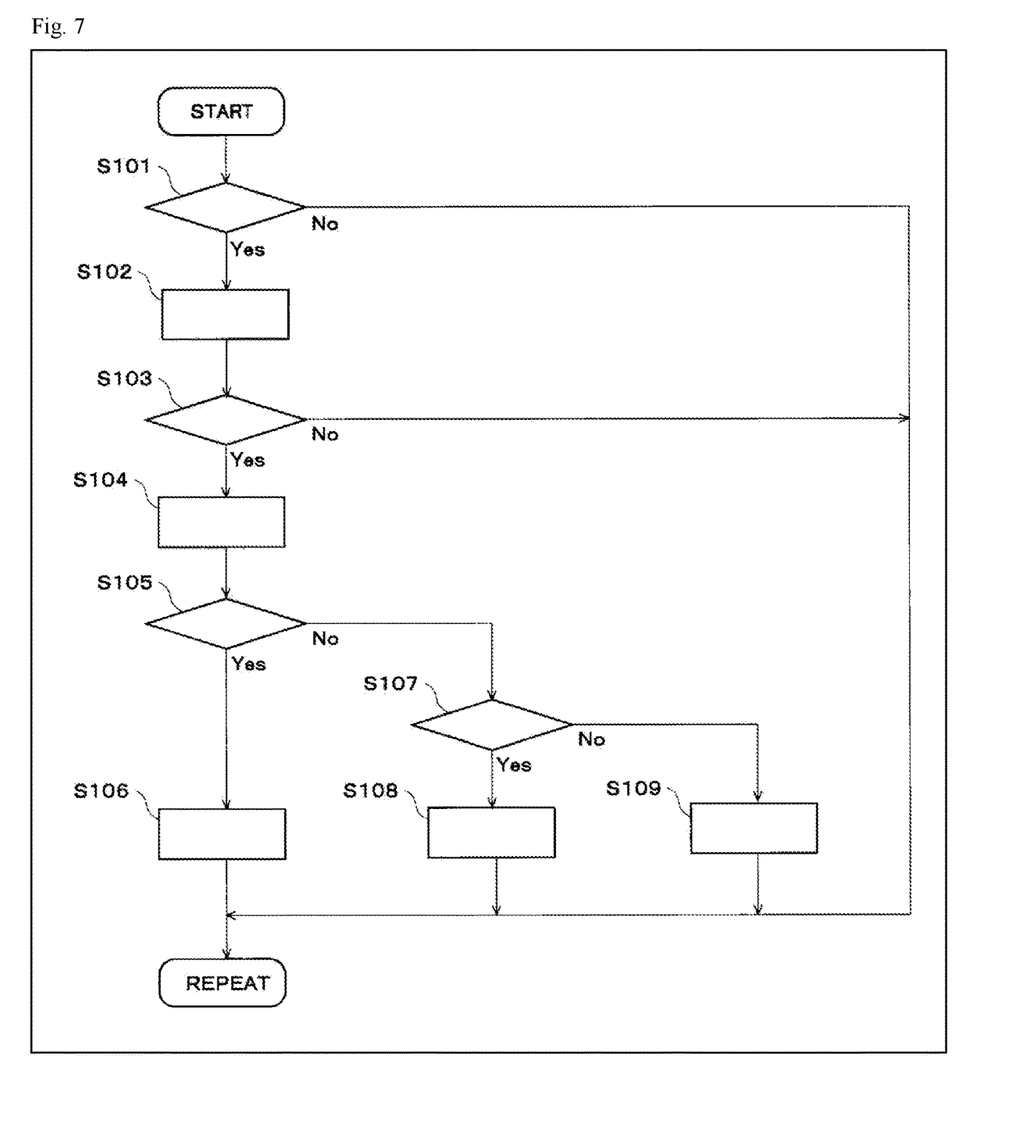
FIG. 7 is a flowchart of a comfort brake function of a brake system according to the embodiment of the invention.

FIG. 7 is a flowchart of the comfort brake function of the brake system according to the embodiment of the invention.

Once the comfort brake function is activated, as depicted in FIG. 7, the process proceeds to step S101.

(Operation State Determination Step)

In step S101, the operation state determination section 62 determines whether the operation state of the brake system 10 by the user is the operation state to instruct the gradual deceleration. That is, the operation state determination section 62 determines whether the user is unintended to rapidly decelerate the vehicle 100. If Yes, the process proceeds to step S102. If No, the process returns to step S101 without executing the slip control.

For example, the operation state determination section 62 determines the following state as the operation state to instruct the gradual deceleration; the user does not operate the front brake operation section 11 but operates the rear brake operation section 13 in a state where the interlocking brake action is not performed.

For example, the operation state determination section 62 determines the following state as the operation state to instruct the gradual deceleration; the user does not operate the front brake operation section 11 but operates the rear brake operation section 13 in a state where the interlocking brake action that generates the braking force on each of the front wheel 3 and the rear wheel 4 through the operation of the rear brake operation section 13 is performed.

For example, the operation state determination section 62 determines the following state as the operation state to instruct the gradual deceleration; an operation amount of the front brake operation section 11 by the user is smaller than a reference amount in the state where the interlocking brake action is not performed.

For example, the operation state determination section 62 determines the following state as the operation state to instruct the gradual deceleration; the operation amount of the front brake operation section 11 by the user is smaller than the reference amount in a state where the interlocking brake action that generates the braking force on each of the front wheel 3 and the rear wheel 4 through the operation of the front brake operation section 11 is performed or in the state where the interlocking brake action that generates the braking force on each of the front wheel 3 and the rear wheel 4 through the operation of the rear brake operation section 13 is performed.

For example, the operation state determination section 62 determines the following state as the operation state to instruct the gradual deceleration; the operation amount of the front brake operation section 11 by the user is smaller than the reference amount, and an operation amount of the rear brake operation section 13 by the user is smaller than a reference amount in the state where the interlocking brake action is not performed.

For example, the operation state determination section 62 determines the following state as the operation state to instruct the gradual deceleration; the operation amount of the front brake operation section 11 by the user is smaller than the reference amount, and the operation amount of the rear brake operation section 13 by the user is smaller than the reference amount in the state where the interlocking brake action that generates the braking force on each of the front wheel 3 and the rear wheel 4 through the operation of the front brake operation section 11 is performed or the state where the interlocking brake action that generates the braking force on each of the front wheel 3 and the rear wheel 4 through the operation of the rear brake operation section 13 is performed.

(Slippage Degree Acquisition Step)

When the slippage degree acquisition section 63 acquires the degree of the slippage of the rear wheel 4 in step S102, the process proceeds to step S103. For example, the slippage degree acquisition section 63 computes an estimated vehicle speed Vref of the vehicle 100 on the basis of the rotational speed Vw of the front wheel 3 detected by the front-wheel rotational speed sensor 43 and the rotational speed Vw of the rear wheel 4 detected by the rear-wheel rotational speed sensor 44, and calculates the slip rate S from a relationship between the estimated vehicle speed Vref and the rotational speed Vw of the rear wheel 4.

(Braking Force Control Execution Step—1)

In step S103, the braking force control execution section 61 determines whether the degree of the slippage of the rear wheel 4, which is acquired by the slippage degree acquisition section 63, exceeds a reference degree. If Yes, the process proceeds to step S104, and the slip control is executed. If No, the process returns to step S101 without executing the slip control. The reference degree is set to be lower than the target set by the target setting section 64. In addition, the reference degree may be variable in accordance with the vehicle speed of the vehicle 100, the vehicle acceleration of the vehicle 100 (the vehicle deceleration, the vehicle lateral acceleration), the operation state of the brake system 10 by the user, the change amount of the brake input generated in the brake system 10, or the like. For example, in the case where the slippage degree acquisition section 63 acquires the slip rate S, the braking force control execution section 61 determines whether the slip rate S exceeds a starting slip rate S_th.

(Target Setting Step)

When the target setting section 64 sets the target of the degree of the slippage in step S104, the process proceeds to step S105. For example, in the case where the slippage degree acquisition section 63 acquires the slip rate S, the target setting section 64 sets an upper limit slip rate S_upper-limit and a lower limit slip rate S_lower-limit, each of which is lower than a lower limit slip rate of the region A depicted in FIG. 4, as the targets.

For example, the upper limit slip rate S_upper-limit and the lower limit slip rate S_lower-limit are set to be lower as the estimated vehicle speed Vref of the vehicle 100 that is estimated at the time point is increased. As the vehicle speed of the vehicle 100 is increased, the vehicle 100 is more likely to become unstable during the deceleration. Accordingly, in the case where the upper limit slip rate S_upper-limit and the lower limit slip rate S_lower-limit are set, just as described, the vehicle 100 is less likely to become unstable in a state where the estimated vehicle speed Vref is high, and insufficiency of the braking force on the rear wheel 4 can be suppressed in a state where the estimated vehicle speed Vref is low.

For example, the upper limit slip rate S_upper-limit and the lower limit slip rate S_lower-limit are set to be higher as estimation accuracy of the estimated vehicle speed Vref at the time point is degraded. Normally, the estimation accuracy of the estimated vehicle speed Vref is degraded as the vehicle speed of the vehicle 100 is decreased. Accordingly, in the case where the upper limit slip rate S_upper-limit and the lower limit slip rate S_lower-limit are set, just as described, early intervention of the control for the rear wheel 4 can be prevented in a state where the accuracy of the acquired slip rate S is degraded due to the low vehicle speed of the vehicle 100, and thus the insufficiency of the braking force on the rear wheel 4 can be suppressed.

For example, the upper limit slip rate S_upper-limit and the lower limit slip rate S_lower-limit are set to be lower as the vehicle deceleration of the vehicle 100 at the time point, which is computed on the basis of the estimated vehicle speed Vref, is increased. As the vehicle deceleration of the vehicle 100 is increased, locking or possible locking of the rear wheel 4 is more likely to occur. In the case where the upper limit slip rate S_upper-limit and the lower limit slip rate S_lower-limit are set, just as described, the slip control can be applied to a wide range of the vehicle deceleration. Thus, usefulness of the comfort brake function is improved.

For example, the upper limit slip rate S_upper-limit and the lower limit slip rate S_lower-limit are set to be lower as the vehicle lateral acceleration of the vehicle 100 detected by an acceleration sensor (not depicted) at the time is increased. As the vehicle lateral acceleration of the vehicle 100 is increased, stability of the vehicle 100 is more likely to be degraded. Accordingly, in the case where the upper limit slip rate S_upper-limit and the lower limit slip rate S_lower-limit are set, just as described, the stability of the vehicle 100 can be secured by suppressing the slippage in a state where the vehicle lateral acceleration of the vehicle 100 is high, and the insufficiency of the braking force on the rear wheel 4 can be suppressed in a state where the vehicle lateral acceleration thereof is low.

For example, the upper limit slip rate S_upper-limit and the lower limit slip rate S_lower-limit are set to be lower as the operation state of the brake operation section (the front brake operation section 11, the rear brake operation section 13) by the user at the time becomes a state where the vehicle deceleration occurred to the vehicle 100 is increased. In the case where the upper limit slip rate S_upper-limit and the lower limit slip rate S_lower-limit are set, just as described, the slip control can be applied to various operation states. Thus, the usefulness of the comfort brake function is improved.

For example, the upper limit slip rate S_upper-limit and the lower limit slip rate S_lower-limit are set to be lower as the operation state of the brake operation section (the front brake operation section 11, the rear brake operation section 13) by the user at the time becomes a state where the rear wheel 4 is more likely to come off the ground. As the operation state of the brake operation section becomes the state where the rear wheel 4 is more likely to come off the ground, locking or possible locking of the rear wheel 4 is more likely to occur. Accordingly, in the case where the upper limit slip rate S_upper-limit and the lower limit slip rate S_lower-limit are set, just as described, the rear wheel 4 can be less likely to be locked or possibly locked in the state where the rear wheel 4 is likely to come off the ground, and the insufficiency of the braking force on the rear wheel 4 can be suppressed in a state where the rear wheel 4 is less likely to come off the ground.

For example, the upper limit slip rate S_upper-limit and the lower limit slip rate S_lower-limit are set to be lower as the change amount of the brake input generated in the brake system 10 at the time is increased. The change amount of the brake input may be the hydraulic pressure of the brake fluid in the master cylinder 21 of the rear-wheel brake mechanism 14 detected by the master-cylinder pressure sensor 41, or may be the stroke amount of the rear brake operation section 13, the stroke amount of the piston (not depicted) installed in the master cylinder 21 of the rear-wheel brake mechanism 14, or the like. As the change amount of the brake input is increased, locking or possible locking the rear wheel 4 is more likely to occur. In the case where the upper limit slip rate S_upper-limit and the lower limit slip rate S_lower-limit are set, just as described, the slip control can be applied to a wide range of the change amount of the brake input. Thus, the usefulness of the comfort brake function is improved.

(Braking Force Control Execution Step—2)

In step S105, the braking force control execution section 61 determines whether the degree of the slippage of the rear wheel 4, which is acquired by the slippage degree acquisition section 63, is brought into a state of falling below the lower limit value of the target of the degree of the slippage, which is set by the target setting section 64, from a state of not falling below the lower limit value of the target of the degree of the slippage. If Yes, the process proceeds to step S106. If No, the process proceeds to step S107. For example, in the case where the slippage degree acquisition section 63 acquires the slip rate S, the braking force control execution section 61 determines whether the slip rate S is brought into a state of falling below the lower limit slip rate S_lower-limit from a state of not falling below the lower limit slip rate S_lower-limit.

(Braking Force Control Execution Step—3 Braking Force Increasing Action)

In step S106, the braking force control execution section 61 actuates the brake system 10 such that the braking force generated on the rear wheel 4 is gradually increased by a specified amount and thereafter becomes constant. Then, the process returns to step S101. Because the braking force generated on the rear wheel 4 is gradually increased, comfortability of the comfort brake function is improved. In the cases where the operation state of the brake system 10 by the user is changed and locking or possible locking of the rear wheel 4 occurs during the process, the anti-lock brake control is executed. For example, the braking force control execution section 61 controls the actions of the inlet valve 31, the outlet valve 32, the pump 34, and the like, so as to control the braking force generated on the rear wheel 4.

(Braking Force Control Execution Step—4)

In step S107, the braking force control execution section 61 determines whether the degree of the slippage of the rear wheel 4, which is acquired by the slippage degree acquisition section 63, is brought into a state of exceeding the upper limit value of the target of the degree of the slippage, which is set by the target setting section 64, from a state of not exceeding the upper limit value of the target of the degree of the slippage. If Yes, the process proceeds to step S108. If No, the process proceeds to step S109. For example, in the case where the slippage degree acquisition section 63 acquires the slip rate S, the braking force control execution section 61 determines whether the slip rate S is brought into a state of exceeding the upper limit slip rate S_upper-limit from a state of not exceeding the upper limit slip rate S_upper-limit.

(Braking Force Control Execution Step—5 Braking Force Decreasing Action)

In step S108, the braking force control execution section 61 controls the brake system 10 such that the braking force generated on the rear wheel 4 is rapidly decreased by a specified amount and thereafter becomes constant. Then, the process returns to step S101. Because the braking force generated on the rear wheel 4 is rapidly decreased, locking or possible locking of the rear wheel 4 is reliably suppressed. In the cases where the operation state of the brake system 10 by the user is changed and locking or possible locking of the rear wheel 4 occurs during the process, the anti-lock brake control is executed. For example, the braking force control execution section 61 controls the actions of the inlet valve 31, the outlet valve 32, the pump 34, and the like, so as to decrease the braking force generated on the rear wheel 4.

(Braking Force Control Execution Step—6 Braking Force Retaining Action)

In step S109, the braking force control execution section 61 controls the brake system 10 such that the braking force generated on the rear wheel 4 is retained. Then, the process returns to step S101. For example, the braking force control execution section 61 controls the actions of the inlet valve 31, the outlet valve 32, the pump 34, and the like, so as to retain the braking force generated on the rear wheel 4.

Figure 8:
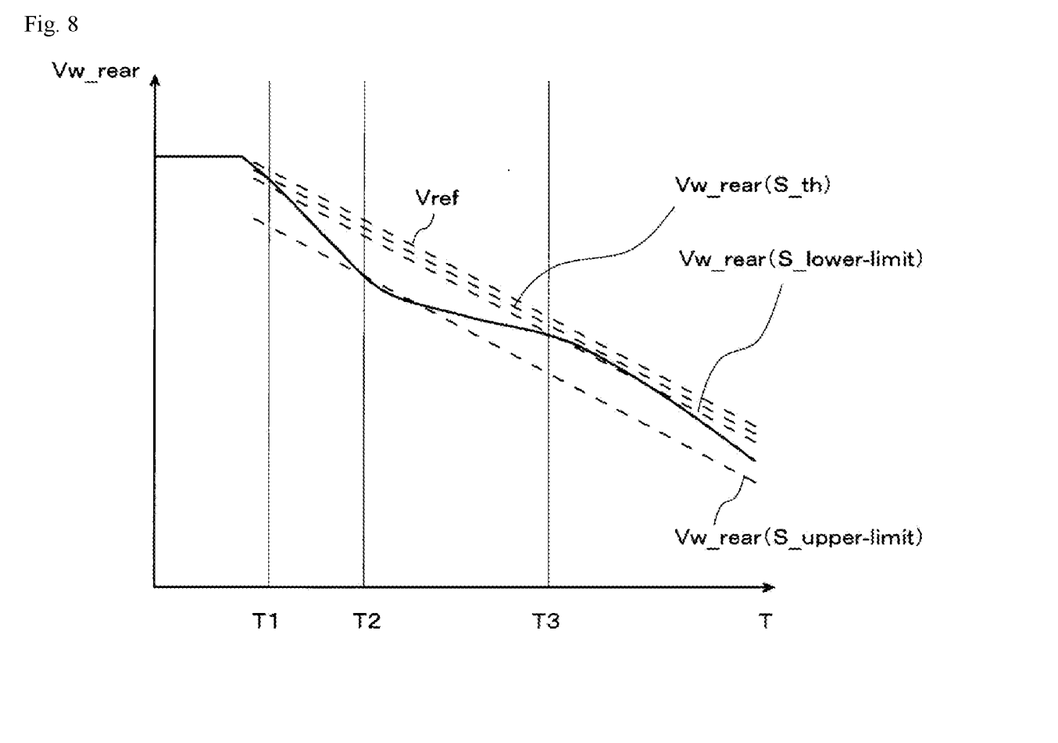
FIG. 8 is a graph that explains an operational effect of slip control executed by the brake system according to the embodiment of the invention.
Figure 9:
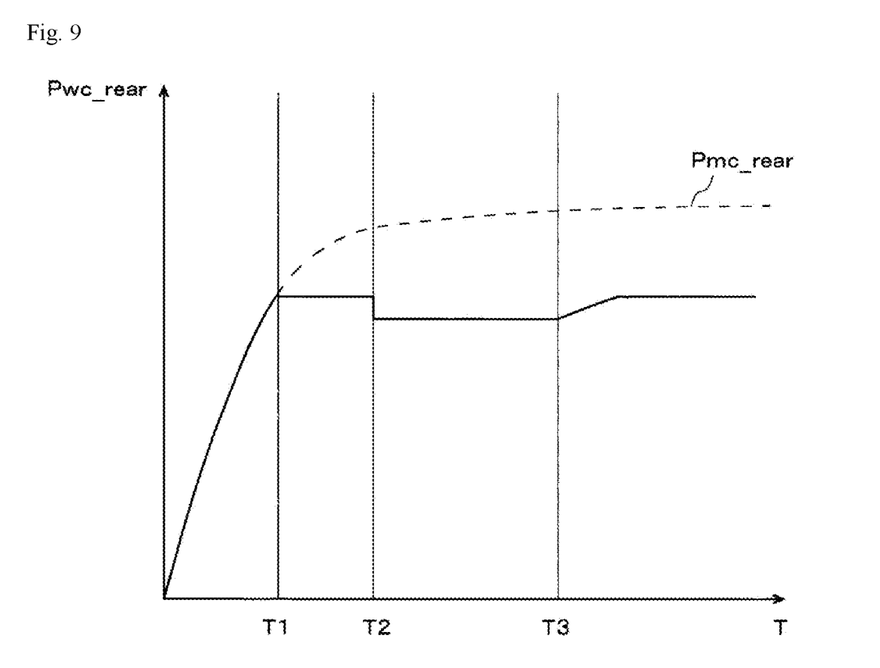
FIG. 9 is a graph that explains an operational effect of the slip control executed by the brake system according to the embodiment of the invention.

FIG. 8 and FIG. 9 are graphs, each of which explains an operational effect of the slip control executed by the brake system according to the embodiment of the invention. Here, in FIG. 8, a horizontal axis represents the time T, and a vertical axis represents a rotational speed Vw_rear of the rear wheel 4. In FIG. 9, a horizontal axis represents the time T, and a vertical axis represents a hydraulic pressure Pwc_rear of the brake fluid in the wheel cylinder 24 on the rear wheel 4 side. In addition, a description will hereinafter be made on the case where the slippage degree acquisition section 63 acquires the slip rate S.

As depicted in FIG. 8, at a time point of time T1, the slip rate S of the rear wheel 4, which is acquired by the slippage degree acquisition section 63, exceeds the starting slip rate S_th, that is, the rotational speed Vw_rear of the rear wheel 4 falls below a rotational speed Vw_rear(S_th) that corresponds to the starting slip rate S_th. In such a case, as depicted in FIG. 9, the braking force generated on the rear wheel 4 is retained at the time T1 onward.

As depicted in FIG. 8, at a time point of time T2, the slip rate S of the rear wheel 4, which is acquired by the slippage degree acquisition section 63, exceeds the upper limit slip rate S_upper-limit, that is, the rotational speed Vw_rear of the rear wheel 4 is brought into a state of falling below a rotational speed Vw_rear(S_upper-limit) that corresponds to the upper limit slip rate S_upper-limit. In such a case, as depicted in FIG. 9, at the time T2 onward, the braking force generated on the rear wheel 4 is rapidly decreased by the specified amount and thereafter becomes constant.

As depicted in FIG. 8, at a time point of time T3, the slip rate S of the rear wheel 4, which is acquired by the slippage degree acquisition section 63, falls below the lower limit slip rate S_lower-limit, that is, the rotational speed Vw_rear of the rear wheel 4 is brought into a state of exceeding a rotational speed Vw_rear(S_lower-limit) that corresponds to the lower limit slip rate S_lower-limit. In such a case, as depicted in FIG. 9, at the time T3 onward, the braking force generated on the rear wheel 4 is gradually increased by the specified amount and thereafter becomes constant.

In other words, in the slip control, compared to the anti-lock brake control, the rotational speed Vw_rear of the rear wheel 4 is gradually changed, and the comfort brake function is thereby realized.

<Effects of Brake System>

A description will be made on effects of the brake system according to the embodiment.

The controller 60 includes: the operation state determination section 62 that determines the operation state of the brake system 10 by the user; the slippage degree acquisition section 63 that acquires the degree of the slippage (the slip rate S) of the wheel (the rear wheel 4); the target setting section 64 that sets the target (the upper limit slip rate S_upper-limit, the lower limit slip rate S_lower-limit) of the degree of the slippage (the slip rate S); and the braking force control execution section 61 that increases or decreases the braking force on the wheel (the rear wheel 4) on the basis of a comparison result between the degree of the slippage (the slip rate S) and the target (the upper limit slip rate S_upper-limit, the lower limit slip rate S_lower-limit) in the case where the operation state determination section 62 determines that the operation state is the operation state to instruct the gradual deceleration. Accordingly, in the case where the operation state is the operation state to instruct the gradual deceleration, recognition of locking or possible locking of the wheel (the rear wheel 4) can be suppressed, and thus the user can be suppressed from receiving the sense of discomfort unnecessarily. In addition, in the case where the operation state is the operation state to instruct the gradual deceleration, for example, the target setting section 64 sets the target to be low. In this way, such a degree of the slippage (such a slip rate S) as to increase the friction coefficient μ of the wheel (the rear wheel 4) to be the highest can be less likely to be generated. Thus, a state where the tire is likely to sideslip unnecessarily regardless of a fact that the user has no intention of rapidly decelerating the vehicle 100 can be suppressed.

Preferably, in the case where the degree of the slippage (the slip rate S) is higher than the target (the upper limit slip rate S_upper-limit, the lower limit slip rate S_lower-limit), the braking force control execution section 61 performs the braking force decreasing action. In the case where the degree of the slippage (the slip rate S) is lower than the target (the upper limit slip rate S_upper-limit, the lower limit slip rate S_lower-limit), the braking force control execution section 61 performs the braking force increasing action. With such control, the above-described effect is reliably secured.

Preferably, in the braking force decreasing action and the braking force increasing action, the braking force control execution section 61 makes a change in the rotational speed Vw of the wheel (the rotational speed Vw_rear of the rear wheel 4) gradual in comparison with that in the anti-lock brake control. With such control, the comfortability of the comfort brake function is reliably secured.

Preferably, the target setting section 64 changes the target (the upper limit slip rate S_upper-limit, the lower limit slip rate S_lower-limit) in accordance with the vehicle speed of the vehicle 100, the vehicle acceleration (the vehicle deceleration, the vehicle lateral acceleration) of the vehicle 100, the operation state of the brake system 10 by the user, the change amount of the brake input generated in the brake system 10, or the like. With such control, the stability of the vehicle 100 can be secured, the insufficiency of the braking force on the wheel (the rear wheel 4) can be suppressed, the usefulness of the comfort brake function can be improved, and the like.

Preferably, the targets set by the target setting section 64 is the region that has the upper limit (the upper limit slip rate S_upper-limit) and the lower limit (the lower limit slip rate S_lower-limit). With such a configuration, the braking force generated on the wheel (the rear wheel 4) can be retained, and thus the comfortability of the comfort brake function is improved.

Preferably, the vehicle 100 is the motorcycle. In the case where the vehicle 100 is the motorcycle, the state where the tire is more likely to sideslip unnecessarily has a significant impact. Thus, the controller 60 as described above is particularly useful.

In particular, in the cases where the wheel is the rear wheel 4 and the operation state is the operation state to instruct the gradual deceleration, the braking force control execution section 61 preferably executes the slip control of the rear wheel 4. In addition, in the specified state during the deceleration of the vehicle 100, the braking force control execution section 61 preferably executes the anti-lock brake control to increase/decrease the braking force generated on the front wheel 3 regardless of the operation state. With such a configuration, the braking distance of the vehicle 100 can reliably be shortened.

In particular, the operation state determination section 62 preferably determines the state where the user does not operate the front brake operation section 11 but operates the rear brake operation section 13 as the operation state to instruct the gradual deceleration. In addition, the operation state determination section 62 preferably determines the state where the operation amount of the front brake operation section 11 by the user is smaller than the reference amount as the operation state to instruct the gradual deceleration. Furthermore, the operation state determination section 62 preferably determines the state where the operation amount of the front brake operation section 11 by the user is smaller than the reference amount and the operation amount of the rear brake operation section 13 by the user is smaller than the reference amount as the operation state to instruct the gradual deceleration. With such control, reliability of the determination by the operation state determination section 62 is improved.

The description has been made so far on the embodiment. However, the invention is not limited to the description of the embodiment. For example, only a part of the embodiment may be implemented, or an order of the steps may be changed.

REFERENCE SIGNS LIST

1: Trunk
2: Handlebar
3: Front wheel
3a: Rotor
4: Rear wheel
4a: Rotor
10: Brake system
11: Front brake operation section
12: Front-wheel brake mechanism
13: Rear brake operation section
14: Rear-wheel brake mechanism
21: Master cylinder
22: Reservoir
23: Brake caliper
24: Wheel cylinder
25: Primary channel
26: Secondary channel
27: Supply channel 31: Inlet valve
32: Outlet valve
33: Accumulator
34: Pump
35: First valve
36: Second valve
41: Master-cylinder pressure sensor
42: Wheel-cylinder pressure sensor
43: Front-wheel rotational speed sensor
44: Rear-wheel rotational speed sensor
50: Hydraulic pressure control unit
51: Base body
60: Controller
61: Braking force control execution section
62: Operation state determination section
63: Slippage degree acquisition section
64: Target setting section
100: Vehicle

The invention claimed is:

1. A controller controlling a braking force generated on a wheel of a vehicle by a brake system of the vehicle, the controller comprising:
a braking force control execution section that makes the brake system execute anti-lock brake control to repeatedly increase and decrease the braking force generated on the wheel in a specified state during rapid deceleration of the vehicle, and further comprising:
an operation state determination section determining an operation state of the brake system by a user;
a slippage degree acquisition section acquiring a degree of slippage of the wheel; and
a target setting section setting a target of the degree of the slippage as a region having a lower limit and an upper limit, wherein
in the case where the operation state determination section determines that the operation state is an operation state to instruct gradual deceleration, the braking force control execution section increases the braking force generated on the wheel when the degree of the slippage acquired by the slippage degree acquisition section is lower than the lower limit set by the target setting section, and the braking force control execution section decreases the braking force generated on the wheel when the degree of the slippage acquired by the slippage degree acquisition section is greater than the upper limit set by the target setting section, and
wherein the wheel is a rear wheel, and the vehicle is a motorcycle that includes a front wheel and the rear wheel.

2. The controller according to claim 1, wherein
the braking force control execution section retains the braking force generated on the wheel when the degree of the slippage acquired by the slippage degree acquisition section is higher than the lower limit set by the target setting section and lower than the upper limit set by the target setting section.

3. The controller according to claim 2, wherein
in the braking force decreasing and the braking force increasing, the braking force control execution section makes a change in a rotational speed of the wheel gradual in comparison with that in the anti-lock brake control.

4. The controller according to claim 1, wherein
the target setting section changes the upper limit and the lower limit of the target in accordance with a vehicle speed of the vehicle.

5. The controller according to claim 1, wherein
the target setting section changes the upper limit and the lower limit of the target in accordance with vehicle acceleration of the vehicle.

6. The controller according to claim 1, wherein
the target setting section changes the upper limit and the lower limit of the target in accordance with the operation state.

7. The controller according to claim 1, wherein
the target setting section changes the upper limit and the lower limit of the target in accordance with a change amount of brake input generated in the brake system.

8. The controller according to claim 1, wherein
the braking force control execution section executes the anti-lock brake control to increase and decrease the braking force generated on the front wheel during the rapid deceleration of the vehicle.

9. The controller according to claim 8, wherein
the brake system includes: a front brake operation section at least generating the braking force on the front wheel; and a rear brake operation section at least generating the braking force on the rear wheel, and
the operation state determination section determines a state where the user does not operate the front brake operation section but operates the rear brake operation section as the operation state to instruct the gradual deceleration.

10. The controller according to claim 8, wherein
the brake system includes: a front brake operation section at least generating the braking force on the front wheel; and a rear brake operation section at least generating the braking force on the rear wheel, and
the operation state determination section determines a state where an operation amount of the front brake operation section by the user is smaller than a reference amount as the operation state to instruct the gradual deceleration.

11. The controller according to claim 8, wherein
the brake system includes: a front brake operation section at least generating the braking force on the front wheel; and a rear brake operation section at least generating the braking force on the rear wheel, and
the operation state determination section determines a state where an operation amount of the front brake operation section by the user is smaller than a reference amount and an operation amount of the rear brake operation section by the user is smaller than a reference amount as the operation state to instruct the gradual deceleration.

12. A control method for controlling a braking force generated on a wheel of a vehicle by a brake system of the vehicle comprising:
a braking force control execution step of making the brake system execute anti-lock brake control to repeatedly increase and decrease the braking force generated on the wheel in a specified state during rapid deceleration of the vehicle, and further comprising:
an operation state determination step of determining an operation state of the brake system by a user;
a slippage degree acquisition step of acquiring a degree of slippage of the wheel; and
a target setting step of setting a target of the degree of the slippage as a region having a lower limit and an upper limit, wherein
in the case where it is determined in the operation state determination step that the operation state is an operation state to instruct gradual deceleration, in the braking force control execution step, the braking force generated on the wheel is increased when the degree of the slippage acquired in the slippage degree acquisition step is lower than the lower limit of the target set in the target setting step, the braking force generated on the wheel is decreased when the degree of the slippage acquired in the slippage degree acquisition step is greater than the upper limit of the target set in the target setting step, and the braking force generated on the wheel is retained when the degree of the slippage acquired in the slippage degree acquisition step is greater than the lower limit of the target set in the target setting step and lower than the upper limit of the target set in the target setting step, and wherein the wheel is a rear wheel, and the vehicle is a motorcycle that includes a front wheel and the rear wheel.

13. The method according to claim 12, wherein the braking force control execution step makes a change in rotational speed of the wheel gradual in comparison with that in the anti-lock brake control.

14. The method according to claim 12, wherein the target setting step includes changing the upper limit and the lower limit of the target in accordance with a vehicle speed of the vehicle.

15. The method according to claim 12, wherein the target setting step includes changing the upper limit and the lower limit of the target in accordance with vehicle acceleration of the vehicle.

16. The method according to claim 12, wherein the target setting step includes changing the upper limit and the lower limit of the target in accordance with a change amount of brake input generated in the brake system.

* * * * *